United States Patent [19]

Blume

[11] 3,925,166

[45] Dec. 9, 1975

[54] AUTOMATED SYSTEM FOR THE DETERMINATION OF BACTERIAL ANTIBIOTIC SUSCEPTIBILITIES

[75] Inventor: Philip Blume, Minneapolis, Minn.

[73] Assignee: The United States of America as represented by the Secretary of the Department of Health, Education and Welfare, Washington, D.C.

[22] Filed: Sept. 6, 1974

[21] Appl. No.: 503,744

[52] U.S. Cl. ............................................... 195/139
[51] Int. Cl.² ........................................... C12K 1/04
[58] Field of Search .............. 195/103.5 R, 127, 139

[56] References Cited
UNITED STATES PATENTS

| | | | |
|---|---|---|---|
| 3,574,063 | 4/1971 | Bowman | 195/103.5 R |
| 3,694,317 | 9/1972 | Scher | 195/103.5 R |
| 3,736,432 | 5/1973 | Sweet | 195/103.5 R |
| 3,776,817 | 12/1973 | Van Der Pfordten | 195/103.5 R |
| 3,778,351 | 12/1973 | Roson | 195/127 |

*Primary Examiner*—A. Louis Monacell
*Assistant Examiner*—Robert J. Warden
*Attorney, Agent, or Firm*—Browdy and Neimark

[57] ABSTRACT

A system —for automatically determining the sensitivity of a number of different antibiotics to a particular strain of bacteria— comprises an improved sample plate containing a plurality of channels to which differing concentrations and types of antibiotics are introduced. An agar solution containing a suspension of bacteria is then drawn into the different chambers of the sample plate and allowed to gel. The plate is then scanned, both before incubation and then after incubation, by an intense beam of light in order to count the number of bacterial colonies in each channel to determine which antibiotic best combats that particular strain of bacteria. The output of these scans can then be passed to a computer which analyzes the results of the scans and indicates which of the tested antibiotics is best suited for dealing with that particular strain of bacteria.

7 Claims, 2 Drawing Figures

U.S. Patent  Dec. 9, 1975  3,925,166
FIG.1
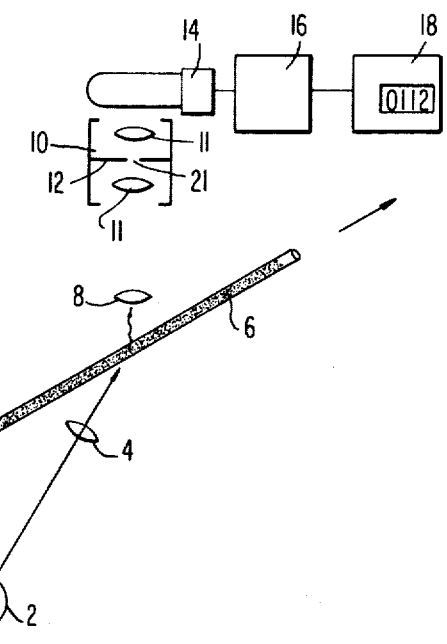
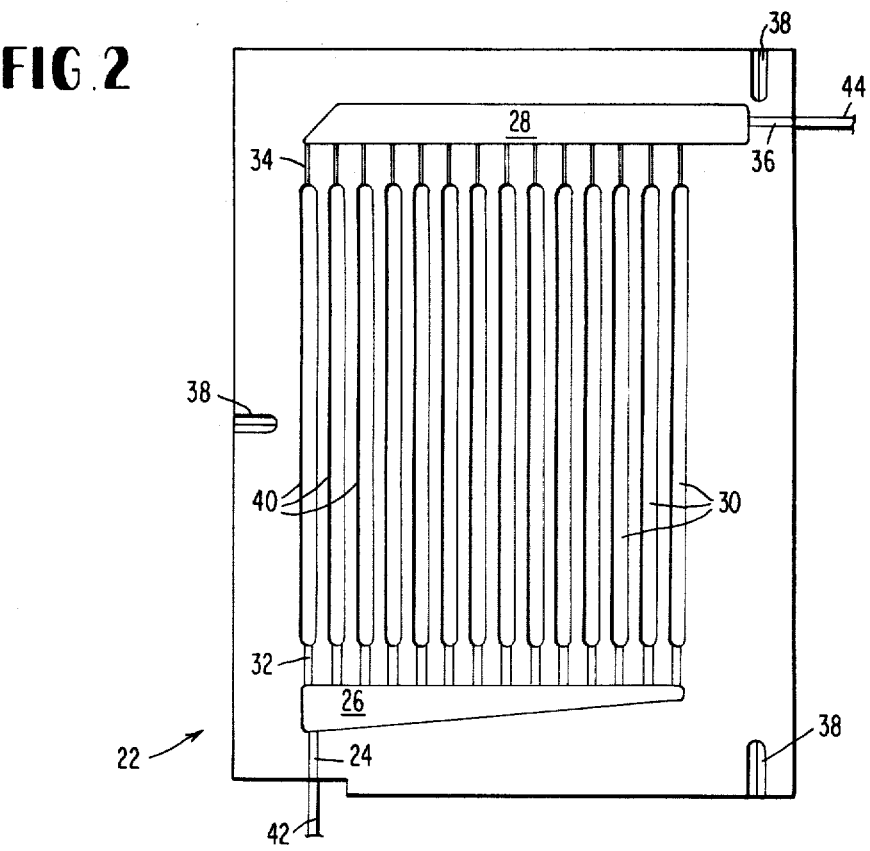
FIG.2

AUTOMATED SYSTEM FOR THE DETERMINATION OF BACTERIAL ANTIBIOTIC SUSCEPTIBILITIES

FIELD OF THE INVENTION

The present invention relates to an automated system for determination of bacterial antibiotic susceptibilities. It encompasses an automatic bacterial colony counter which determines the presence of viable bacteria in a gelled medium contained in a narrow tube by passing it through an intense light beam and detecting the light scattered from the discrete particles in the gel by a detection means. All of the resultant electrical pulses from the detection means of a magnitude exceeding some set threshold level are counted, with an increasing count after incubation being evidence of the presence of viable organisms.

BACKGROUND OF THE INVENTION

For a variety of reasons, not the least of which is the operationally defined nature of many of the variables which it seeks to determine, clinical microbiology has not yet reached the degree of analytical automation that chemistry or hematology has achieved. Among those procedures of great clinical significance for which automated techniques would be most welcome is the determination of the most suitable antibiotics for the treatment of an infection from which one or more pathogenic organisms have been isolated.

Previously Bowman has developed a quite simple technique for the automated detection and enumeration of bacterial colonies (U.S. Pat. No. 3,574,063). This technique consisted of culturing the bacterial specimen as a suspension in nutrient agar contained in a glass capillary tube. When this tube is moved through an intense beam of light, particles in the agar would scatter light as they pass through the beam and this light could be sensed by photo-detector positioned so as not to receive any of the direct illumination from the source. The light scattered from the discrete particles results in electrical pulses which increase in magnitude as the particles increase in size. This procedure determines the count of the particles as well as their size on the basis of pulse amplitudes.

To determine the antiobiotic susceptibility of an isolated organism, a variety of capillary tubes containing a suspension of the organisms in nutrient agar, and in addition either no antibiotic (control) or any one of several concentrations of a variety of different antibiotics is scanned following preparation but prior to incubation. The preparation is then incubated and rescanned. Scatter signals attributable to inert debris will remain unchanged, but if viable bacteria are present in the preparation, new scatter points, i. e., microcolonies will emerge and grow. With a fast growing organism such as E. coli or Klebsiella, this growth is detected in 2 hours or less. Much slower growing organisms might require overnight incubation, but these preparations may be rescanned a number of times until the desired information is obtained. After incubation the growth within the antibiotic-containing tubes is compared with that of the control tubes to determine which antiobiotic is effective and at what concentration.

While under ideal conditions, one might hope to include single bacteria among the particles counted during the preincubation scan and determine viability by noting an increase in the size of those particles as they begin to divide, this is very difficult when dealing with agar suspensions since the agar has inherent light scattering properties. Consequently only particles larger than 5 to 10 microns will be counted by providing the output of the photo detector with a trigger circuit which will provide a single fixed voltage output pulse for each light scatter input pulse above the set threshold. This threshold is fixed at a level exceeding the amplitude of most of the inert scattering particles in the preparation. The output pulses are counted with an electronic counter and the results desplayed by means of a printer.

Numerous studies have been performed which confirm the effectiveness of this concept. During these studies the organisms tested included *E. coli, Kliebsiella, Pseudomonas, Bacteroids, Clostridia, Staphylococci, Streptococci, Pneumococci,* and *Hemophilus* strains. Antibiotics tested therewith have included ampicillin, cephalothin, chloramphenicol, gentamicin, kanamycin, polymixin and tetracycline. The results obtained with the instrumental approach compared favorably with standard broth dilution testing.

However, while this method proved to be reliable, the time and effort required to prepare the numerous aliquots of a single specimen, the addition of the appropriate antbiotic solutions and the filling and sealing of individual capillary tubes was so great that the use of individual tubes did not provide a commercially satisfactory operation. In dealing with bacterial infections, time is of the essence in determining what type and what concentration of antibiotic should be used. Thus, it was important to develop a technique which would reduce the sample preparation time to the order of a couple of minutes for the entire array of antibiotics.

SUMMARY OF THE INVENTION

It is accordingly an object of the present invention to overcome the defects of the prior art, such as indicated above.

Another object is to provide for the rapid detection of the bacteiral susceptibility of a given strain to a given antibiotic.

Another object is to develop a bacterial antibiotic susceptibility system which is capable of being broken down into modules which can be designed and constructed separately.

A further object is to provide a non-dedicated system where the type of procedure to be performed does not depends upon the nature of the sample.

Yet another object is to provide a system which employs a gelled rather than a liquid medium so that the procedures based upon the enumeration of viable organisms in a speciment can be performed.

Another object is to provide a system which utilizes a minimum amount of medium and takes a relatively small amount of laboratory space.

In general, the invention involves the utilization of a sample plate having a plurality of channels, into which there may be placed means for providing varying antibiotics and/or varying concentrations of antibiotics, after which the microorganisms and the nutrient may be fed to the channels.

In order to better understand the invention, a possible embodiment thereof will now be described with reference to the attached drawing, it being understood that this embodiment is exemplary and not limitative.

BRIEF DESCRIPTION OF THE DRAWING

FIG. 1 is a schematic representation of the colony counter principle;

FIG. 2 is a plan view of a sample plate in accordance with the present invention.

Referring now to the drawing, FIG. 1 shows diagrammatic representation of the colony counter principle, depicting how tubes 20, e.g. capillary tubes, are scanned for the presence of bacterial colonies. This system consists of a high intensity light source 2 such as one illuminated by a tungsten filament 3. As the capillary tube is passed axially through the scanning field in the direction noted by the arrow, the lamp 2 is focused, e.g. by a 3.5 X microscope objective 4 disposed between the lamp 2 and the capillary tube 20. This allows a magnified image of the filament to be produced within the capillary tube 20 containing an agar or other nutrient suspension of bacterial colonies 6. The tube 20 is moved through the light beam by a motor driven carriage (not shown). The light scattered from particles within the capillary tube 20 is collected, e.g. by a low power microscope consisting of a 3.5 X objective 8 and a 10 X ocular 10, the latter of which contains a pair of lenses 11 separated by an image plate 12.

A narrow slit 21 in the image plate 12 of the ocular 10 defines the field of view of a photo-multiplier 14 positioned so as not to receive any direct illumination from the source 2. This, in essence, being a form of dark field illumination. The photo multiplier 14 then counts the electrical pulses resulting from the scattered light of the discrete particles in the gel, and then passes the information in the form of electrical pulses of varying amplitude to an amplifier and trigger cicuits 16 which produce the output pulses which are then counted and printed out by any suitable output means 18, such as a counter. It should be noted that while only one capillary tube 20 has been depicted in FIG. 1, it can be appreciated that in practice a plurality of capillary tubes may be scanned simultaneously in this manner.

A sample plate 22 which is adapted for use in this automatic system, shown in FIG. 2, is molded of clear acrylic or other plastic (e.g., polymethylmethacrylate) and contains in the illustrated embodiment fourteen parallel U-shaped channels 30 open on the upper surface of the plate. These channels are approximately 2.2 mm wide, 1.8 mm deep and 79 mm long. An inlet manifold 26 and a plurality of inlet contrictions 32, as well as a plurality of outlet constrictions 34 and an outlet manifold 28, are provided in communication with the channels 30.

In use the first step in determining the proper antibiotic to utilize is to coat each of the channels with a different type or concentration of antibiotic. This may be accomplished by the use of antibiotic-impregnated paper cut into narrow strips the length of the channels 30, which strips are each applied with an adhesive to one vertical wall 40 of each channel. The strips do not interfere with light entering the bottom or leaving the top of the plate and provide a uniform distribution of antibiotic along the length of each channel.

While any porous medium can be used, it is preferred to use paper, and the preferred paper is 0.004 inch thick (Difco Laboratories) instead of the thicker material used for the preparation of sensitivity testing discs. This paper is cut into strips of about 25 mm in width and a length equal to that of the channels 30. An adhesive is then applied to one side of the strips. The preferred adhesive is applied by means of a pressure-sensitive adhesive release tape (Minnesota Mining & Manufacturing Company, release tape No. 467). This material consists of a pressure sensitive adhesive coated onto glazed release paper. It can be applied to the antibiotic paper as ordinary adhesive tape would but when it is pulled off, the release paper backing is removed leaving the adhesive film behind. The paper is then further cut into strips of about 1.6 mm wide, the release paper backing removed, and then the strips are carefully pressed against one of the vertical walls 40 of the designated channel 30. It will be understood that other means may be employed for holding the impregnated paper in place.

When all of the channels 30 have been so treated the top of the plate 22 is covered with the clear plastic, e.g., acrylic, polyolefin, saran, nylon, etc. plate or film, preferably an adhesive coated film (Minnesota Mining and Manufacturing Company No. 853), to isolate each channel and to transform the previously open channels 30 into the geometric equivalent of an array of spaced capillary tubes. Other means may be used to tightly maintain the plastic film or plate against the top of the plate 22, if desired. An alternate embodiment would allow not only the parallel channels 30 to be covered, but also the manifolds 26 and 28, and the constrictions 32 and 34 to be similarly sealed.

The molten agar or other transparent nutrient gel solution containing the test organisms is introduced into the channels 30 by means of an input bore 24 which is molded within the plastic and which is adapted for receiving a short length of polyethylene or other plastic tubing 42. Holding the plate 22 vertically, the tubing 42 is placed into the molten agar solution containing the bacteria and suction is applied through a polyethylene or other plastic tubing 44 which is attached to a suction bore 36 molded within the plastic sample plate 22, in a manner similar to the input bore 24. Due to this aspiration, the molten agar will rise into the communicating inlet manifold 26 and then through the constrictions 32 into the channels 30.

As will be seen in FIG. 2, the constrictions 34 closest to the outlet manifold 28 are more narrow than the inlet constrictions 32 nearest the communicating inlet manifold 26. These constrictions are provided because all of the channels 30 will not be filled simultaneously when suction is applied at tubing 44. When the agar in those channels, which by chance happen to fill first, reach the narrower constrictions 34, it does not pass through to the output manifold 28 because of the increased resistance to flow of the narrower constructions 34. Continued application of suction results in the filling of the remaining channels. It is not until all of the channels 30 are filled that the agar will overflow into the outlet manifold 28. At this point, plastic tubes 42 and 44 are heat-sealed and cut off, the agar is allowed to gel, and the initial scan is made.

Three grooves 38, with a triangular cross section are molded into the bottom surface of the plate 22, which grooves may be used to engage a transport carriage used in the scanning process, so that the plate 22 may be positioned accurately.

Extensive studies have been carried out to make certain that the antibiotic for one channel did not reach adjacent channels either bt diffusion along the open channel ends through the manifolds 26, 28 and the constrictions 32, 34; or by extravasation beneath the adhesive plastic film. Both fluorimetric studies using tetracycline, and bacteriological studies using chloramphenicol and a sensitive organism were performed. In the former, tetracycline was placed in one channel but not in adjacent ones and the distribution of the antiobiotic was determined by removing the gel from the plates and assaying different portions fluorimetrically. In the chloroamphenicol studies, one channel was treated with chloramphenicol and the plate was then filled with a suspension of susceptible organisms. Inhibition occurred only in the channel containing the antibiotic and microcolonies could be seen within the constrictions at the ends of that channel. Diffusion, therefore, was shown not to be a problem. The choice of a suitable adhesive eliminated any diffusion beneath the plastic; although various adhesive may be used, the 3M product No. 853 was found satisfactory and its use avoids the necessity of applying adhesive to the film.

Well over 200 laboratory analyses have been made using this newly developed sample plate. The results of a typical analysis are demonstrated in Table I.

pension of the test organisms adjusted to a transmittance of 70%. An aliquot of 0.1 ml of the suspension was added to a tube containing 25 ml of melted agar maintained at 40° – 45°C and mixed well.

The plate was then scanned initially at about 15 minutes and subsequently after a period of incubation of approximately 4 hours in duration. As a comparison, each speciment was also subjected to a disc sensitivity determination using the standard Kirby-Bauer technique, in which the sizes of the zones of inhibition were measured and the characterization of the organisms as "sensitive," "intermediate" or "resistant" was made. It can be seen that there is correlation with the disc results, reported by the Clinical Laboratory. For example, in the instance of ampicillin, information is obtained indicating not only that ampicillin is effective but also at the approximate level it does become effective.

The compactness and exactness of the sample plate lends itself to a closed, completely automated system for determining bacteria sensitivities. Following prepa-

TABLE I

| Antibiotic | μg/ml | Initial Count | Increase in 4 hrs. | Disc Result[3] |
|---|---|---|---|---|
| Ampicillin | 0.1 | 18 | 104 | S |
| | 8 | 13 | 129 | |
| | 32 | 20 | 9 | |
| Carbenicillin | 15 | 13 | 61 | S |
| | 45 | 7 | 10 | |
| | 135 | 17 | − 1 | |
| Cephalothin | 10 | 18 | − 2 | S |
| | 30 | 12 | − 2 | |
| | 100 | 11 | 4 | |
| Chloramphenicol | 5 | 17 | − 1 | S |
| | 10 | 13 | − 6 | |
| | 20 | 7 | 3 | |
| Clindamycin | 0.2 | 9 | 72 | R |
| | 2 | 16 | 100 | |
| | 8 | 15 | 82 | |
| Erythromycin | 0.2 | 15 | 111 | R |
| | 2 | 8 | 77 | |
| | 8 | 15 | 45 | |
| Gentamycin | 1 | 17 | 32 | S |
| | 5 | 13 | − 1 | |
| | 10 | 12 | 2 | |
| Kanamycin | 1 | 17 | 47 | S |
| | 5 | 11 | 5 | |
| | 10 | 13 | 7 | |
| Methicillin | 1 | 7 | 99 | R |
| | 5 | 16 | 108 | |
| | 10 | 13 | 84 | |
| Penicillin | 0.1 | 18 | 90 | R |
| | 8 | 6 | 83 | |
| | 32 | 14 | 109 | |
| Polymixin | 1 | 15 | 131 | S |
| | 5 | 8 | 67 | |
| | 10 | 15 | 13 | |
| Tetracycline | 1 | 10 | 11 | S |
| | 5 | 8 | 9 | |
| | 10 | 11 | − 3 | |
| Controls | | 11 | 143 | |
| | | 12 | 107 | |
| | | 4 | 84 | |
| | | 12 | 118 | |
| | | 11 | 96 | |
| | | 19 | 91 | |

Results reported by clinical microbiology laboratory using standard disc technique. R = resistant; S = Sensitive.

In this case, the organism was *E. coli* isolated from a urine specimen, with the media used consisting of Mueller Hinton broth and Mueller Hinton agar prepared by combining 2.0 gm of potassium nitrate (to minimize bubble formation), 21 gm Mueller Hinton broth, 10 gm agar and 1000 ml water.

Colonies taken from the isolation plates were suspended in broth and diluted to a standard turbidity using a Coleman Universal Spectrometer, with the susration, the plate can be introduced into the scanning instrument by some sort of conveyor device which would automatically present the plates to the scanner periodically, allowing repeated scans to automatically be made until a report is issued.

In addition, this system can be adapted for the use with a small computer interphased with a scanner. In this case, the plates are coated with a machine readable number which is transmitted to the computer by the scanner. In addition, a clock provides the day and year, and time of day each individual plate is scanned. The computer then receives all of the counts of the individual channels and maintains a file of all plate numbers in current use.

When a plate is scanned, the computer searches this file for the number and if such number is not present, the computer files it assuming that this is an initial scan for that particular plate. When the plate in question reappears in the scanner following incubation, the program, now noting the number in the file, automatically recognizes it as a repeat scan. The incubation is then calculated from the clock data and the initial counts are retrieved from the file. The counts in the control channels are examined to determine if sufficient growth has occurred. If not, a note to this effect is printed. If some pre-specified increase in count is reached, the computer then evaluates each of the antibiotic channels classifying them as "resistant," "sensitive" or "intermediate" and then prints a formatted report.

The final report may be printed by the computer as soon as adequate data is obtained, identifying each sample by its appropriate number and leaving spaces available for filling in a patient's name and other data pertinent to the analysis. Each day the files may be purged of data pertaining to completed analyses and this data may, if desired, be stored on magnetic tape for future use in statistical analyses.

While the sample plate has been described particularly in relation to antibiotic sensitivity testing, it is not to be limited to this application. Without the antibiotic, the plate may be used for a general culture device for automated colony counts. For example, the plates may be used for culturing urine in order to determine the present of urinary tract infections. Furthermore, the reagents introduced into the channels (whether by paper or any other technique) need not be antibiotics; they may be particular nutrient materials or other substances which will contribute information leading to the identification of the particular organism. In some instances, the plate, in conjunction with the counter apparatus, can be used to count viable organisms; a procedure sometimes useful in medicine or widely utilized in food, drug, cosmetic, water and other non-medical assays.

Although the present invention has been described with a certain degree of particularity, it is understood that the present invention is shown by way of example, changes in detail and construction may be made without departing from the spirit thereof. For example, instead of introducing the antibiotic into the channels 30 by way of antibiotic-impregnated paper, the material may be applied as a spray, as a liquid which is subsequently evaporated, or as a dried cast gelatin-like film.

What is claimed is:

1. A sample plate for testing antibiotic susceptibility of bacterially impregnated gels comprising:
   a transparent plate having upper and lower surfaces;
   a plurality of parallel grooves in said plate each of said grooves having an outlet end and an inlet end;
   first and second manifolds disposed in said plate respectively at said inlet end and said outlet end of said parallel grooves;
   first connecting means for connecting each of said inlet ends of said parallel grooves to said first manifold;
   second connecting means for connecting said outlet ends of said parallel grooves to said second manifold;
   an inlet bore connected to said first manifold through which a solution of agar may be introduced to said first manifold;
   an aspiration bore connected to said second manifold, said aspiration bore being adapted to be connected to a means for applying a suction to said aspiration bore, and
   a transparent covering means, sealingly engaging said upper surface of said transparent plate, for forming, with said first and second connecting means and said parallel grooves, a plurality of sealed tube-like channels connecting said first and second manifolds, and for sealing said manifolds.

2. The sample plate of claim 1, wherein said means for connecting said parallel grooves to said first manifold comprise first tubular constrictions narrower in width than said parallel grooves; and
   said means for connecting said parallel grooves to said second manifold comprise second tubular constrictions narrower in width than said first tubular constrictions.

3. The sample plate of claim 1, further comprising antibiotic containing porous strips disposed in said parallel grooves.

4. The device of claim 3, wherein said porous strips comprise antibiotic impregnated paper having an adhesive adhering to the sides of said parallel grooves.

5. The sample plate of claim 1, wherein said transparent covering comprises a sheet of clear plastic adhexively mounted on said plate.

6. A device in accordance with claim 5, wherein said clear sheet is an acrylic plate.

7. A device in accordance with claim 5, wherein said clear sheet is a plastic film.

* * * * *